United States Patent [19]

Willis, Jr.

[11] Patent Number: 4,520,002

[45] Date of Patent: May 28, 1985

[54] METHOD FOR PREPARING ELEMENTAL SULFUR AS A DIFFUSION-RESISTANT GAS AND METHODS FOR ITS USE IN MAKING LIME, SULFUR DIOXIDE AND SULFURIC ACID FROM WASTE GYPSUM

[75] Inventor: Horace E. Willis, Jr., Houston, Tex.

[73] Assignee: Merichem Company, Houston, Tex.

[21] Appl. No.: 572,301

[22] Filed: Jan. 20, 1984

[51] Int. Cl.³ .................. C01B 17/00; C01B 17/42; C01B 17/48; C01B 17/74

[52] U.S. Cl. .................................. 423/522; 423/170; 423/541 R; 423/561 R; 423/567 R; 423/638

[58] Field of Search .............. 423/539, 638, 166, 168, 423/170, 171, 320, 511, 522, 541 R, 561 R, 567 R

[56] References Cited

U.S. PATENT DOCUMENTS 2,425,740  8/1947  Horn ................................ 423/172
2,508,292  5/1950  Porter et al. .................... 423/567 R

*Primary Examiner*—G. L. Kaplan
*Attorney, Agent, or Firm*—Pravel, Gambrell, Hewitt & Kimball

[57] ABSTRACT

The present invention relates to the discovery of a method by which elemental sulfur may be delivered to a reaction zone, for gas-solids reaction, in the form of a concentrated, coherent, diffusion-resistant gas thereby permitting gas-solid reactions of greatly enhanced reaction rates. It has been found that sulfur, which is first vaporized at approximately 1 atmosphere pressure, and then super heated to at least 1270° F. while in transit through a confined space, such as a transfer line, will debouch from said confined space into a reaction zone as a coherent gas which resist diffusion throughout the free space of the reaction zone. This coherent form of sulfur gas exhibits a dark reddish-violet color. The coherent form of sulfur gas, since it resists diffusion throughout the free space of the reaction zone, flows into concentrated contact with, and remains concentrated at, the solids surface, thereby producing a gas-solids reaction of greatly enhanced reaction rate.

Utilizing the above discovery a process has been devised by which the sulfur values present in gypsum, particularly waste by-product gypsum produced by the wet process, may be recovered as $SO_2$ with the concurrent production of lime.

8 Claims, 1 Drawing Figure

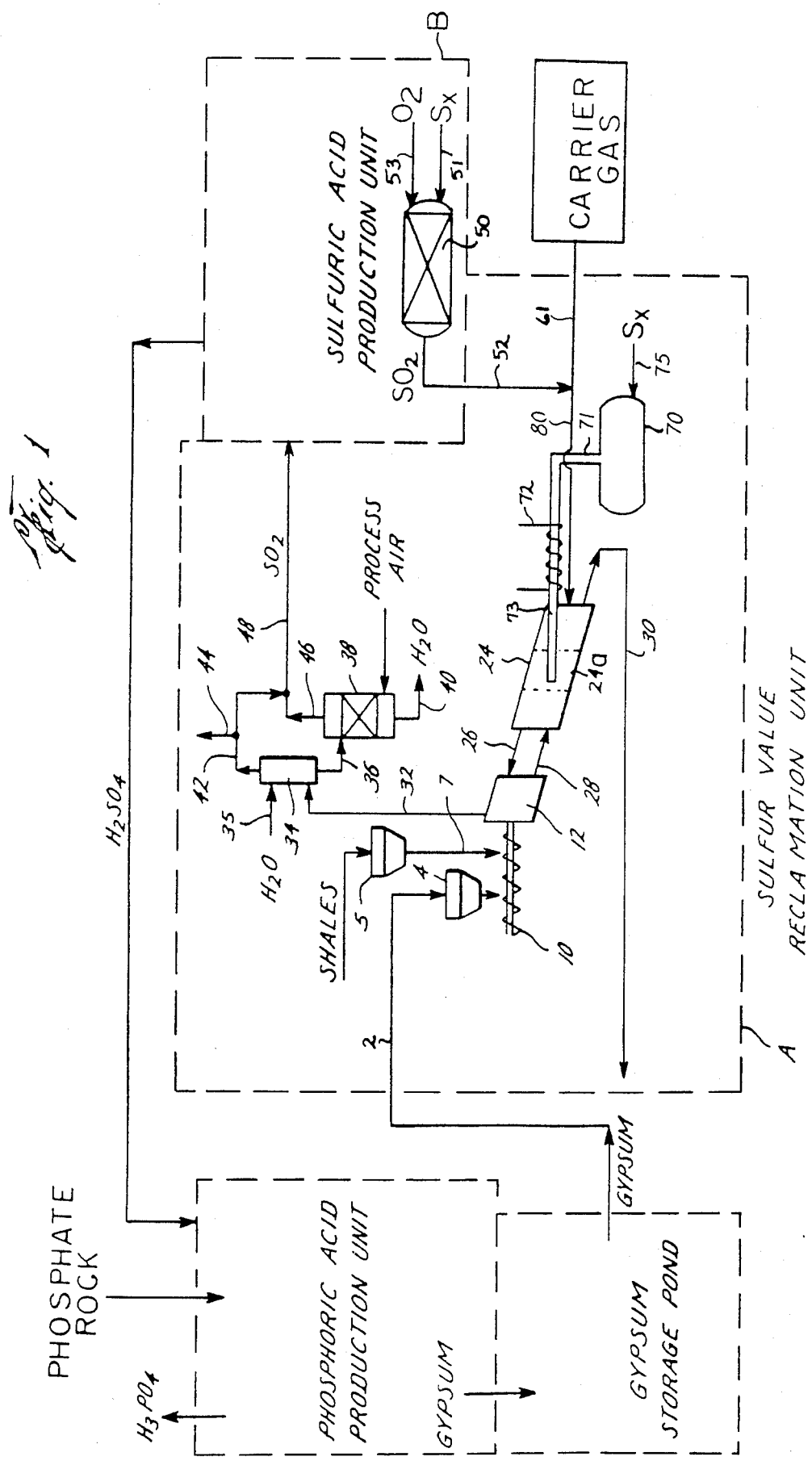

METHOD FOR PREPARING ELEMENTAL SULFUR AS A DIFFUSION-RESISTANT GAS AND METHODS FOR ITS USE IN MAKING LIME, SULFUR DIOXIDE AND SULFURIC ACID FROM WASTE GYPSUM

BACKGROUND OF THE INVENTION

Sulfur is one of the most versatile elements, and it is one of the chemical industry's most widely used raw materials. Still, there are potentially beneficial reactions of sulfur which remain to be developed into practical usage.

For instance, two early references refer to the use of elemental sulfur as a possible reducing agent by which calcium sulfate may be converted to lime and sulfur dioxide. Trautz, Patentschrift No. 356414, states that sulfur vapor may be reacted with calcium sulfate, beginning at a temperature of about 1830° F., to produce lime and sulfur dioxide. To obtain such reaction Trautz caused sulfur vapor to be slowly passed over a combustion boat containing gypsum heated to a temperature of 1832° F. to 2192° F. Horn, U.S. Pat. No. 2,425,740, states that a finely divided mixture of calcium sulfate and elemental sulfur when heated to a temperature of 2400° F. or greater in the presence of excess air, such as in a gas fired rotary kiln, will produce lime and sulfur dioxide.

Theoretically, the reaction between sulfur and calcium sulfate could provide the basis for recovery of sulfur values from gypsum, including that produced in the manufacture of fertilizer grade phosphoric acid by the wet process, where an economical method for recovery of sulfur values from waste gypsum has long been needed.

For each ton of $P_2O_5$ produced as $H_3PO_4$, about three tons of $H_2SO_4$ are consumed and about five tons of wet gypsum ($CaSO_4.2H_2O$) are produced as a waste by-product that must be discarded. During 1964, the wet process production of phosphoric acid surpassed two million short tons annually. Current production in the United States is now estimated to exceed five million short tons per year. Worldwide, the growth and production of wet process phosphoric acid has been even more rapid.

According to estimates for current U.S. production, the wet process produces about twenty-five million short tons of waste by-product gypsum annually. Presently, such waste gypsum constitutes an economic and environmental disadvantage of the wet process that has not yet been satisfactorily resolved. First, there is a significant loss of sulfur values to waste gypsum; at current production rates, about 4.75 million tons of sulfur annually. The loss of sulfur values occurs at a time wherein sulfur prices have been increasing greatly, with yet greater price increases expected in the future in view of the large energy requirements of the Frasch Process. The problem is further aggravated in that significant additional processing costs are incurred in the disposal of the waste gypsum. In addition to the manpower and equipment expenditures necessary for disposal, new disposal sites must continually be purchased (approximately ten-fifteen acres a year for a five hundred ton per day wet process phosphoric acid plant) and pumping costs escalate annually as the gypsum waste pile grows higher and/or the distance between the plant site and disposal site increases. Further, disposal of waste gypsum in this manner takes potentially productive land out of circulation and creates an eyesore that may pose environmental problems.

Even though the Trautz chemistry has been known for more than 65 years, and the Horn patent issued 36 years ago, there has been no known commercialization of a process for recovery of sulfur values based on the reductive reaction of calcium sulfate with elemental sulfur.

The difficulties expected to be associated with maintaining effective contact between sulfur, which at the necessary reaction temperature is a gas, and solid calcium sulfate, so that reaction will occur at practical rates in a kiln or other vessel, have in all probability been the prime factor discouraging development of a sulfur value recovery process based upon the laboratory reaction disclosed by Trautz, Patentschrift No. 356414. See for instance Horn, U.S. Pat. No. 2,425,740, who in an attempt to develop a commercial process from such reaction, found that a minimum temperature for reaction of 2400° F. was required and that excess air had to be employed. Horn's disclosure, which teaches the requirement for high temperatures, establishes that the Trautz reaction is not practically adaptable to a commercial process, and so far as is known no further efforts to use sulfur as a reducing agent have been made since Horn.

The problem resides in the conditions for reaction imposed by having to bring a gas and solid into efficient contact for reaction at practical rates. In a reaction kiln solids flow in countercurrent contact to a gaseous atmosphere. The gaseous atmosphere may be the combustion gases by which heat for reaction is supplied to the kiln—as in a gas fired kiln—or may be an inert gas which is flowed through an indirectly heated kiln for purposes of removing gaseous reaction products. Whatever the nature of the gaseous atmosphere, there exists within the kiln a controlled temperature zone wherein reaction occurs. With the exception of that amount of volume within the reaction zone which is occupied by the solids to be reacted, the remaining or free space of the reaction zone is occupied by gas. Any gaseous reagent added to this zone would be expected to rapidly diffuse throughout the gas atmosphere in such free space hence decreasing the concentration of the gaseous reagent at the surface of the solid with which it is to react.

Diffusion of the sulfur vapor throughout the kiln's free space would dictate a need for dispersal of the calcium sulfate into the gas phase in order to effect maximum contact between the reactants. However, such dispersal decreases the effective concentration of $CaSO_4$ in the reaction zone.

It is known that the rate at which a reaction occurs is proportional to the concentration of the reacting components. For the sulfur - calcium sulfate reaction, a gas-solid reaction, the reaction rate would be proportional to the concentration of gaseous sulfur at the surface of the solid with which it is to react. Increasing the concentration of sulfur vapor at the solid-gas interface would increase the reaction rate.

Although known to be desirable, as yet no means have been devised by which the concentration of a gaseous reagent can be increased at a phase interface by prevention or retardation of the diffusion of that reagent throughout the gaseous phase.

SUMMARY OF THE INVENTION

The present invention relates to the discovery of a method by which elemental sulfur may be delivered to a reaction zone in the form of a concentrated, coherent, diffusion-resistant gas. It has been found that sulfur, which is first vaporized at approximately 1 atmosphere pressure, and then super heated to at least 1270° F. while in transit through a confined space, such as a transfer line, will debouch from said confined space into a reaction zone as a coherent gas which resists diffusion throughout the free space of the reaction zone. This coherent form of sulfur gas exhibits a dark reddish-violet color. The coherent form of sulfur gas, since it resists diffusion throughout the free space of the reaction zone, flows into concentrated contact with the solids surface, thereby producing a gas-solids reaction of greatly enhanced reaction rate.

Utilizing the above discovery a process has been devised by which the sulfur values present in gypsum, particularly waste by-product gypsum produced by the wet process, may be recovered as $SO_2$ with the concurrent production of lime, according to the following stepwise reactions:

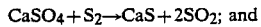

$CaSO_4 + S_2 \rightarrow CaS + 2SO_2$; and

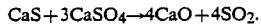

$CaS + 3CaSO_4 \rightarrow 4CaO + 4SO_2$.

Elemental sulfur, prepared in the form of a coherent diffusion resistant gaseous reagent is employed in a process for recovering sulfur values from calcium sulfate in the form of sulfur dioxide which in turn may be converted to sulfuric acid or other useful forms of sulfur. Waste by-product gypsum is dehydrated to $CaSO_4$ and thereafter conveyed to the reaction zone of a rotary kiln operated at a temperature of from about 1400° F. to about 2400° F., and preferably 1600° F. to about 2300° F. Sulfur is vaporized at approximately 1 atmosphere pressure, and super heated to a temperature of at least about 1270° F. during delivery through a conduit to the reaction zone of such kiln where it is debouched from the conduit above the bed of $CaSO_4$ as a coherent, diffusion-resistant, reddish-violet colored gas which flows into concentrated gas-solid contact with the $CaSO_4$. The coherent sulfur gas reacts rapidly and efficiently with a portion of the $CaSO_4$ to produce CaS and $2SO_2$, with the amount of CaS produced being in proportion to complete the reaction with unreacted $CaSO_4$ in accordance with the equation $CaS + 3CaSO_4 \rightarrow 4CaO + 4SO_2$. The solid reaction products of the reaction with sulfur (i.e., CaS and unreacted $CaSO_4$) are conveyed from the sulfur reaction zone to a second reaction zone within which a temperature of at least about 1800° F. is maintained and held in such second zone until the reaction between CaS and $CaSO_4$ is essentially complete. The $SO_2$ generated by the first and second reactions is collected from said zones by passing a non-reactable gas in countercurrent contact there through. Preferably, the collected $SO_2$ is routed to the sulfuric acid unit of the wet processing plant for conversion to sulfuric acid. The solid product of the reclaiming reaction is lime which is collected upon exit from the products end of the kiln. If desired, the sulfur which is combusted in the wet process plant to supply the $SO_2$ requirements for sulfuric acid production may be employed as the combustion gas for firing the kiln reactor, in which case the $SO_2$ combustion gas serves as the non-reactable gas to collect the $SO_2$ generated during the reclaiming reaction from the kiln. Ordinarily, this latter convenience might not be practiced since the presence of excessive $SO_2$ in the gas phase would be expected to depress the sulfur - calcium sulfate reaction rate (according to the LeChatelier Principle), but the availability of the diffusion-resistant form of sulfur allows the reaction to proceed within the solids phase of the kiln.

BRIEF DESCRIPTION OF THE DRAWING

FIG. 1 illustrates a process for reclaiming sulfur values from the waste by-product gypsum of a wet processing plant and its manner of integration therewith. The wet process phosphoric acid unit of the plant is illustrated only as a block diagram.

The sulfur burner of the sulfuric acid unit of the plant is illustrated, but otherwise the sulfuric acid unit of the plant is shown only as a block diagram. The reclaiming kiln 24 may be a direct fired kiln utilizing the combustion gases from the sulfur burner, or an indirectly heated kiln through which an inert or non reactable carrier gas is passed. FIG. 1 illustrates these alternatives. Means for generating and adding sulfur as a coherent diffusion resistant gas to the reaction zone of the kiln is illustrated.

DESCRIPTION OF THE PREFERRED EMBODIMENTS

In the present invention, as FIG. 1 illustrates, gypsum ($CaSO_4 \cdot 2H_2O$), produced as a waste by-product in the wet process production of phosphoric acid, is charged by line 2 to waste gypsum hopper 4. Gypsum from hopper 4 is continuously fed to a feed mill screw conveyor 10. Screw conveyor 10 conveys the gypsum to vessel 12 wherein it is decomposed by dehydration into calcium sulfate ($CaSO_4$) and water vapor. It should be noted that in FIG. 1 the dehydrator 12 and kiln 24 (the operation of which will be discussed subsequently) are shown as separate vessels for clarity of explanation, but those operations could as well take place in separate zones of a single rotary kiln-type vessel in which case screw conveyor 10 would feed directly to the kiln vessel 24. Likewise, where a single vessel is used gas take-off line 32 communicates directly with kiln vessel 24.

In FIG. 1 the sulfur value reclamation unit A of the present invention is shown in integration with a conventional sulfuric acid production unit B of the wet processing plant. The sulfuric acid production unit typically has one or more sulfur burners 50 wherein elemental sulfur is oxidized to $SO_2$ which is then converted into the $H_2SO_4$ utilized in the wet process. As illustrated, liquid elemental sulfur is supplied by line 51 to sulfur burner 50 of the sulfuric acid unit B wherein it is oxidized with preheated air supplied by line 53 to form a gas stream 52 containing $SO_2$ with a high exit temperature from burner 50.

The temperature of the gas stream leaving burner 50 is a function of the amount of sulfur combusted to $SO_2$. Where air is used as the oxygen source, then theoretically a gas stream containing about 20.4% $SO_2$ by volume could be produced. However, considerations such as nitrogen fixation usually impose a practical limitation on the exit $SO_2$ concentration of from about 8.0 to about 12.0 percent by volume. Hence the sulfur burner is preferably operated to produce a gas stream with a burner exit temperature of from about 1600° to about 2300° F. In the process of the invention the most preferred temperature range for the exiting gas stream is from about 2100° to about 2200° F. Typically, the burner may be operated to produce a gas stream containing about 11.5% $SO_2$ with a temperature of about 2170° F.

The high temperature $SO_2$ gas stream may be conveyed from burner 50 by line 52 into line 80 and through kiln 24 to provide the heat of reaction for the reductive reaction between elemental sulfur and calcium sulfate as will be discussed below. In transit through kiln 24 the high temperature $SO_2$ gas stream in part provides the thermal energy requirements for the sulfur - calcium sulfate reduction and the other reactions, by heating the calcium sulfate to its desired reaction temperature, and therefore the temperature of the $SO_2$ gas stream becomes progressively lower as it passes toward exit line 26 of kiln 24. Additionally, the gas stream takes up the additional quantity of $SO_2$ generated by the conversion of calcium sulfate upon transit through kiln 24. The $SO_2$ containing gas stream which exits kiln 24 through line 26 is at a temperature exceeding that required to dehydrate gypsum and is thereby conveyed to and through dehydrator vessel 12. The hot gas stream there countercurrently contacts the gypsum in dehydrator 12 wherein it supplies the thermal energy required to dehydrate gypsum to calcium sulfate and water vapor, the water vapor being taken up by the gas stream as it passes out of dehydrator 12 through line 32.

The calcium sulfate is conveyed from dehydrator 12 by line 28 to kiln 24. The calcium sulfate is conveyed through kiln 24 in countercurrent contact with the high temperature $SO_2$ gas stream entering kiln 24 from lines 52 and 80. There, the calcium sulfate undergoes heating to a temperature of from about 1600° F. to about 2000° F., and preferably about 1800° to about 1900° F., as it moves toward the reaction zone 24a of kiln 24.

Kiln 24 is provided with a transfer line or sulfur delivery conduit 73, the exit end of which is positioned in the reaction zone 24a of the kiln 24 above the solids bed. That portion of conduit 73 which extends externally of kiln 24 is heat traced with electrical heaters 72, or other suitable means of heating. Transfer line 73 communicates through line 71 to a sulfur kettle 70 which is provided with means (not illustrated) for controllably heating kettle 70. Elemental sulfur is supplied by line 75 to kettle 70 wherein it is heated to the boiling point of sulfur to produce sulfur vapor. Sulfur vapor so produced rises from kettle 70 into line 71 and passes therethrough into transfer line 73, where the sulfur vapor is super heated, by heat tracing means 72, so as to provide a suitable temperature, preferably from about 875° F. to about 1000° F., at the point where transfer line 73 enters kiln 24. A portion of transfer line 73 internal to the kiln is not insulated and, being exposed to the high temperature within the kiln, is heated by the kiln temperature. As the super heated sulfur vapor passes through this internal portion of transfer line 73 it undergoes further super heating until it reaches a temperature of at least about 1270° F., preferably from about 1300° F. to about 1800° F. So long as a temperature of at least about 1270° F. is reached, the sulfur, as it debouches from the exit end of transfer line 73, debouches as a dark reddish-violet colored gas which is coherent and resists diffusion throughout the free space of the kiln reaction zone 24a. The coherent sulfur gas so produced descends from the exit end of transfer line 73 and contacts, in the thus concentrated diffusion-resistant gas form, the surface of the solids within the reaction zone 24a of kiln 24.

Sulfur is supplied to reaction zone 24a in an amount sufficient to complete the stoichiometry for the overall reaction of:

$$4CaSO_4 + S_2 \rightarrow 4CaO + 6SO_2.$$

As previously discussed, the reclamation process effectively proceeds as two steps. In reaction zone 24a of kiln 24, calcium sulfate and the coherent sulfur gas rapidly undergo the following reaction:

$$CaSO_4 + S_2 \rightarrow CaS + 2SO_2.$$

Thereafter the calcium sulfide so produced reacts with the remaining calcium sulfate to produce lime and an additional quantity of sulfur dioxide. The rate at which the sulfur - calcium sulfate reaction occurs is substantially enhanced by use of sulfur gas in coherent form. The second reaction, that between calcium sulfide and calcium sulfate, thus becomes rate limiting on the overall reaction, and provisions must be made for a residence time within kiln 24, or a separate treating vessel, at temperature above about 1800° F., preferably at about 1950° to 2400° F., for the calcium sulfate and calcium sulfide to undergo substantially complete reaction to sulfur dioxide and lime.

Solid lime exits kiln 24 by line 30 and is conveyed to storage. Additionally, lime by-product may be diverted into the production of Portland Cement by addition of suitable shales and the like to the lime-calcium sulfate mixture entering kiln 24. Hence, an optional shale hopper 5 is illustrated in FIG. 1 from which shale may be fed by line 7 to screw conveyor 10 where is become intimately mixed with the gypsum. When Portland Cement is produced as the by-product, it exits kiln 24 by line 30 and is conveyed to storage.

The gas stream in which $SO_2$ generated from calcium sulfate is taken up passes out from kiln 24 by line 26 to dehydrator 12. The $SO_2$ gas stream is passed out of dehydrator 12 by line 32. The $SO_2$ containing gas stream is routed by line 32 to a scrubber 34 to remove excess water vapor. Scrubber 34 is supplied with operating water taken from the wet process plant's gypsum storage pond by line 35. The gas stream entering scrubber 34 is reduced in temperature to below the dew point of water, typically to about 77° F. The water condensed from the gas stream and the scrubber cooling water collect in the bottom of scrubber 34 and is passed by line 36 to stripper 38. During scrubbing any nitrous oxides or other potentially troublesome components such as dust, unreacted sulfur, fluorine compounds, etc. that may be present in the gas stream are removed with the condensed water. Some $SO_2$ is also dissolved in and removed with the condensed water passing out of scrubber 34. In stripper 38, dissolved $SO_2$ is stripped from the condensed water and passes out as an overhead through line 46. Water stripped of $SO_2$ passes out of stripper 38 by line 40 and is circulated back to the gypsum storage pond. In stripper 38 air may be added to the gas stream to the extent necessary to provide the proper $O_2/SO_2$ ratio, when the $SO_2$ portions from the scrubber 34 and stripper 38 are combined, for subsequent catalytic conversion to $SO_3$ in sulfuric acid unit B. $SO_2$ passing through scrubber 34 as overhead is conveyed by line 42 to line 48 wherein it is combined with $SO_2$ produced in stripper 38 which is conveyed by line 46 to line 48. Line 48 conveys the combined $SO_2$ to the sulfuric acid production unit B for production of H₂SO₄ to be utilized in the wet process. Alternatively, if desired, the SO₂ containing gas stream in line 48 may be treated by any other known process for conversion of the SO₂ to other usable sulfur products.

Since an excess of SO₂ over that required for conversion to the wet process plant's requirements of H₂SO₄ will be generated (assuming all waste gypsum is treated for sulfur reclamation), a SO₂ take off line 44 is provided in line 42. Excess SO₂ may be taken off at this point and recovered as liquid SO₂ to satisfy the needs of any local market that may exist for this product. The gas stream exiting scrubber 34 may serve as a feed stream to a recovery unit for production of liquified SO₂.

Although the procedure for producing coherent sulfur gas for reaction with solids is described with particular reference to its reaction with CaSO₄, it should be understood that the benefit so obtained—enhanced reaction rate—is applicable to any reaction wherein gaseous sulfur may be reacted with a solid reactant. Hence, the method of supplying coherent sulfur gas to a reaction zone may be used to react sulfur with other metal sulfates, oil-bearing shales, various mineral rocks, etc.

EXAMPLE

A rotary kiln measuring about 4 inches inside diameter and 6 feet in length was constructed of high-alumina quartz. The kiln was indirectly heated by exteriorly mounted electrical heaters to provide for three separate heating zones. The solids inlet end of the kiln was supplied with a screw feeder drive which was fed with powdered calcium sulfate by a suitable hopper arrangement. A gas takeoff line was provided at the solids inlet end of the kiln. The solids outlet end of the kiln was provided with a gas inlet line by which nitrogen, oxygen, sulfur dioxide or controlled mixtures thereof could be passed through the kiln.

The solids outlet end of the kiln was provided with a sulfur transfer line. The exterior portion of the transfer line comprised a 4 foot length of ½ inch diameter 316 SS tubing which was electrically traced and insulated. At the kiln inlet flange the exterior transfer line was coupled to a piece of ¼ inch diameter, schedule 40, 304 SS pipe which extends about 23 inches into the kiln. About the first 12 inches of the interior transfer line was insulated, the remaining portion being uninsulated. A 304 SS coupling to which was cemented a 99.7% Al₂O₃ feed tube, 10 mm o.d.×7 mm i.d.×360 mm long, was secured to the end of the transfer line as the feed tip. The feed tip of the transfer line was positioned about 2½ inches above the floor of the kiln.

The transfer line was connected to a 5,000 milliliter glass flask in which industrial grade powdered sulfur was electrically melted and vaporized at about 2 inches water pressure and 835° F., forcing vapor through the transfer line. The transfer line heaters were adjusted to provide a temperature of between 875° F. and about 1000° F. at the kiln inlet flange. Powdered calcium sulfate was supplied to the kiln at a constant rate by the screw feed drive and occupied about 12.5% of the kiln volume on a settled solids basis. A counter current gas flow was provided to the kiln at a flow of about 1 standard cubic foot per minute with a pressure of about −0.1 inch water on the kiln, the gas comprising nitrogen with up to about 30% sulfur dioxide. The three temperature zones of the kiln, from solids inlet side to solids outlet side, were controlled at 1500° F., 1900° F. and 2080° F. respectively. The kiln was rotated at a rate of about 5 RPM.

The amount of sulfur supplied to the kiln was controlled by controlling its boil up rate from the flask. When the sulfur feed rate was less than about 4.0 grams/minute, the sulfur appeared at the feed tip of the transfer line as a soft blue "halo" which visibly and rapidly diffused into the gas phase of the kiln. When sulfur was fed at rates in excess of about 8.0 grams/minute, it appeared at the transfer line feed tip as a deep, cherry-red cloud which also visibly and rapidly diffused into the gas phase. When sulfur was fed at rates between about 4.5 grams/minute and 7.5 grams/minute, it appeared at the transfer line feed tip as a dark, reddish-violet vapor which did not visibly diffuse as it fell through the kiln gas, and disappeared into the calcium sulfate solids on the floor. Increasing the concentration of sulfur dioxide in the carrier gas phase to more than 30% did not appear to disturb the coherence of the concentrated sulfur gas stream issuing from the transfer line, although the point of contact between the coherent sulfur gas and calcium sulfate on the floor appeared to move slightly up the kiln. When oxygen was added to the inlet carrier gases so that its concentration was more than 30% oxygen at the sulfur transfer line feed tip, the reddish-violet sulfur vapor stream maintained its coherence, even though some luminous, bright-blue and orange "fringes" could be discerned. From observation it was determined that the coherent form of sulfur reached the calcium sulfate as a gas stream no more than about 1.25 times the diameter of the transfer line feed tip.

In runs wherein sulfur vapor was supplied to the reaction zone as a non-coherent gas, although some reaction between sulfur and calcium sulfate was observed, the rate of reaction was slow and the efficiency of reaction was low. In runs wherein sulfur was supplied to the reaction zone as a coherent concentrated gas it was observed to react with calcium sulfate at commercially acceptable rates and efficiencies. Thus, when sulfur was delivered in concentrated coherent gas form to at least 8.5 times its own weight of calcium sulfate, the reaction was essentially complete within 5 seconds of contact time at a temperature above 1832° F. In another run, at 1910° F., sulfur delivered in concentrated coherent gas form to 10 times its own weight of calcium sulfate reacted at greater than 95% efficiency in less than 4 seconds of contact time.

Although the invention has been described with regards to its preferred embodiments, those having ordinary skill in the art may appreciate from this disclosure that various changes and modifications be made which do not depart from the scope and spirit of the invention as described above or claimed hereafter.

I claim:

1. A method for preparing elemental sulfur as a coherent diffusion resistant gas for reaction with solid reactants, comprising the steps of:

heating elemental sulfur to the boiling point of sulfur in an enclosed vessel which communicates with a delivery conduit to continuously supply sulfur vapor to said conduit;

super heating said sulfur vapor during transit through said delivery conduit to a temperature of at least about 1270° F.; and debouching said super heated sulfur vapor from said conduit into a reaction zone to which solid reactant is continuously supplied, whereby said super heated sulfur vapor debouches in the form of a coherent diffusion resistant gas which flows into concentrated contact with said solid reactant.

2. A method for obtaining sulfur dioxide by reacting calcium sulfate with a coherent diffusion resistant gaseous reagent form of elemental sulfur, comprising the steps of:
   continuously supplying calcium sulfate to a reaction zone maintained at a temperature of from about 1600° F. to about 2300° F.;
   heating elemental sulfur to the boiling point of sulfur in an enclosed vessel which communicates with a delivery conduit to continuously supply sulfur vapor to said conduit;
   super heating said sulfur vapor during transit through said delivery conduit to a temperature of at least about 1270° F.; and
   debouching said super heated sulfur vapor from said conduit into said reaction zone as a coherent gas which resists diffusion within said reaction zone and thus flows into concentrated contact with said calcium sulfate whereby calcium sulfate is converted by reaction with said sulfur into calcium sulfide and sulfur dioxide.

3. The method of claim 1 or 2, wherein said sulfur vapor is heated during transit through said delivery conduit to a temperature of from about 1300° F. to about 1800° F.

4. A method for obtaining sulfur dioxide and lime from calcium sulfate, comprising the steps of:
   continuously supplying calcium sulfate to a first reaction zone maintained at a temperature of from about 1600° F. to about 2300° F.;
   heating elemental sulfur to the boiling point of sulfur in an enclosed vessel which communicates with a delivery conduit to continuously supply sulfur vapor to said conduit;
   super heating said sulfur vapor during transit through said delivery conduit to a temperature of at least about 1270° F.;
   debouching said super heated sulfur vapor from said conduit into said first reaction zone as a coherent gas which resists diffusion in said first zone and thus flows into concentrated contact with said calcium sulfate whereby a portion of said calcium sulfate is converted into calcium sulfide and sulfur dioxide; and
   supplying said calcium sulfide and said unreacted portion of calcium sulfate to a second reaction zone which is held at a temperature of at least about 1800° F. and maintaining said solids in said second zone for a time sufficient to permit essentially complete reaction between calcium sulfate and calcium sulfide to produce lime and sulfur dioxide.

5. The method of claim 4 wherein said sulfur vapor during transit through said delivery conduit is heated to a temperature of from about 1300° F. to about 1800° F.

6. The method of claim 5 wherein the temperature of said second reaction zone is held at from about 1950° F. to about 2300° F.

7. A method for recovering sulfur values from waste by-product gypsum produced by the wet process production of phosphoric acid as sulfur dioxide, comprising the steps of:
   dehydrating gypsum to convert gypsum to calcium sulfate;
   supplying said calcium sulfate to a first reaction zone maintained at a temperature of from about 1600° F. to about 2300° F.;
   heating elemental sulfur to the boiling point of sulfur in an enclosed vessel which communicates with a delivery conduit to continuously supply sulfur vapor to said conduit;
   super heating said sulfur vapor during transit through said delivery conduit to a temperature of from about 1300° F. to about 1800° F.;
   debouching said super heated sulfur vapor from said conduit into said first reaction zone as a coherent gas which resists diffusion within said first zone and thus flows into concentrated contact with said calcium sulfate whereby a portion of said calcium sulfate is converted into calcium sulfide and sulfur dioxide; and
   supplying said calcium sulfide and said unreacted portion of calcium sulfate to a second reaction zone which is held at a temperature of from about 1800° F. to about 2400° F. and maintaining said solids in said second zone for a time sufficient to permit essentially complete reaction between calcium sulfide and calcium sulfate to produce lime and sulfur dioxide.

8. A method for recovering sulfur values from waste by-product gypsum produced by the wet process production of phosphoric acid and recycling such sulfur values as sulfuric acid for utilization as a reagent in the wet process, comprising the steps of:
   dehydrating said gypsum to convert gypsum to calcium sulfate;
   supplying said calcium sulfate to a first reaction zone maintained at a temperature of from about 1600° F. to about 2300° F.;
   heating elemental sulfur to the boiling point of sulfur in an enclosed vessel which communicates with a delivery conduit to continuously supply sulfur vapor to said conduit;
   super heating said sulfur vapor during transit through said delivery conduit to a temperature of from about 1300° F. to about 1800° F.;
   debouching said super heated sulfur vapor from said conduit into said first reaction zone as a coherent gas which resists diffusion within said first zone and thus flows into concentrated contact with said calcium sulfate whereby a portion of said calcium sulfate is converted into calcium sulfide and sulfur dioxide;
   supplying said calcium sulfide and said unreacted portion of calcium sulfate to a second reaction zone which is held at a temperature of from about 1950° F. to about 2400° F. and maintaining said solids in said second zone for a time sufficient to permit essentially complete reaction between calcium sulfide and calcium sulfate to produce lime and sulfur dioxide;
   passing a non-reacting gas in counter-current flow through said second and first zone to collect and remove the sulfur dioxide generated therein from said zones; and
   converting said collected sulfur dioxide to sulfuric acid.

* * * * *